US012647465B2

(12) United States Patent
White

(10) Patent No.: US 12,647,465 B2
(45) Date of Patent: Jun. 2, 2026

(54) SECURE ONLINE EXCHANGE OF DIGITAL IDENTIFICATION

(71) Applicant: NETRIVER SYSTEMS LIMITED, Weymouth (GB)

(72) Inventor: David John White, Weymouth (GB)

(73) Assignee: NETRIVER SYSTEMS LIMITED, Weymouth (GB)

( * ) Notice: Subject to any disclaimer, the term of this patent is extended or adjusted under 35 U.S.C. 154(b) by 65 days.

(21) Appl. No.: 18/683,067

(22) PCT Filed: Aug. 12, 2022

(86) PCT No.: PCT/GB2022/052110
§ 371 (c)(1),
(2) Date: Feb. 12, 2024

(87) PCT Pub. No.: WO2023/017281
PCT Pub. Date: Feb. 16, 2023

(65) Prior Publication Data
US 2024/0348659 A1     Oct. 17, 2024

(30) Foreign Application Priority Data

Aug. 12, 2021     (GB) ...................................... 2111568

(51) Int. Cl.
*H04L 9/40* (2022.01)
(52) U.S. Cl.
CPC .................................... *H04L 63/20* (2013.01)
(58) Field of Classification Search
CPC .................. H04L 63/20; H04L 63/428; G06F 2221/2141

(Continued)

(56) References Cited

U.S. PATENT DOCUMENTS 7,685,206 B1 *    3/2010  Mathew ................ H04L 63/105
                                                                707/785
9,298,940 B1 *    3/2016  Paris ................... H04L 63/0435
                          (Continued)

FOREIGN PATENT DOCUMENTS

EP          2603876 A2      6/2013
EP          2883204 B1     10/2020
                (Continued)

OTHER PUBLICATIONS

International Search Report for PCT/GB2022/052110 dated Nov. 7, 2022 (2 pages).

(Continued)

*Primary Examiner* — Liang Che A Wang
(74) *Attorney, Agent, or Firm* — Tutunjian & Bitetto, P.C.

(57)     ABSTRACT

A communications network enabling a plurality of entities to obtain digital information from one another, which communications network includes a plurality of systems which are mutual peers on the network configured and arranged to operate as agents for respective entities, wherein the plurality of such agents includes a first agent for a first said entity requiring an item of said digital information and a second agent for accessing the information item, and wherein said first and second agents have individual policies defining standards for their management of said digital information and a common operating protocol whereby: said first entity initiates an information exchange process by entering a request for the required information item on the first agent, the first agent connects to the second agent and the first and second agents then engage in a conversation in which they request and exchange germane data.

16 Claims, 4 Drawing Sheets

(58) Field of Classification Search
USPC ............................................. 726/1; 709/225
See application file for complete search history.

(56) References Cited

U.S. PATENT DOCUMENTS

| | | | | |
|---|---|---|---|---|
| 11,777,932 B1 * | 10/2023 | Kempf | .................... | H04L 63/20 |
| | | | | 726/4 |
| 2003/0110397 A1 * | 6/2003 | Supramaniam | ....... | H04L 63/102 |
| | | | | 726/1 |
| 2005/0080914 A1 | 4/2005 | Lerner et al. | | |
| 2018/0032757 A1 * | 2/2018 | Michael | ................. | G16H 10/60 |
| 2019/0165941 A1 * | 5/2019 | Ray | ......................... | H04L 9/006 |
| 2020/0259849 A1 * | 8/2020 | Irwan | ...................... | H04L 12/66 |
| 2020/0394531 A1 | 12/2020 | Rigotti et al. | | |

FOREIGN PATENT DOCUMENTS

| | | | | | |
|---|---|---|---|---|---|
| FR | 2950214 | A1 | 3/2011 | | |
| GB | 2367395 | A | 4/2002 | | |
| WO | WO-2004071103 | A2 * | 8/2004 | .......... | H04L 67/535 |
| WO | 2007047798 | A1 | 4/2007 | | |
| WO | 2020101471 | A1 | 5/2020 | | |

OTHER PUBLICATIONS

GB Search Report issued in corresponding Application No. GB2111568.8 dated Jan. 25, 2022 (2 pgs).

* cited by examiner

SECURE ONLINE EXCHANGE OF DIGITAL IDENTIFICATION

TECHNICAL FIELD

This invention concerns a communications network for the secure exchange of digital information, particularly but not necessarily online exchange of identity information such as names and addresses and other identification data.

DESCRIPTION OF RELATED ART

Various methods are known for securing digital information when exchanged.

One such method is disclosed in French patent application FR2950214 (Alcatel). This involves requesting verification of user profile data from a social networking site in which the verification request includes a verification indicator for the data. A request corresponding to the verification request is sent to a server agent from the client agent. A return message is received from the server agent, where the message includes the user profile data that is accompanied with a verification marker representative of certification of the data by a social network side if the data is certified. This is essentially just a request-response arrangement and a security failing in it is that there is no validation or other check of the client agent.

Another approach to securing information exchanged online is disclosed in international patent application WO2020/101471 (Mimos), which is directed at transaction signing and identification management by establishing trust between the parties involved. Like the Alcatel arrangement described above, this uses request-response in a client-server configuration, but with the additional feature that each side challenges the other to provide cryptographic proof that it is to be trusted. A problem here is that it calls for additional complication in requiring a public key as proof of validation.

An approach which avoids cryptographic proofing is disclosed in United States patent application US2019/0165941 (CT Labs). This determines whether a cable modem device is to be trusted based on a policy drawing on and manipulating metrics from multiple sources to calculate a trust indicator confidence level. But mining disparate data sources increases both complexity in the process and doubt in the reliability of the calculation.

It is an object of the present invention to overcome the problems of previous systems noted above.

SUMMARY OF THE INVENTION

Thus according to the invention there is provided a communications network enabling a plurality of entities to obtain digital information from one another, which communications network comprises a plurality of systems which are mutual peers on the network configured and arranged to operate as agents for respective entities, wherein the plurality of such agents comprises a first agent for a first said entity requiring an item of said digital information and a second agent for accessing the information item, and wherein said first and second agents have individual policies defining standards for their management of said digital information and a common operating protocol whereby:

said first entity initiates an information exchange process by entering a request for the required information item on the first agent, the first agent connects to the second agent and the first and second agents then engage in a conversation in which they request and exchange germane data; and when the second agent has sufficient data to meet its policy standards for releasing said information item to the first agent then the second agent releases the information item to the first agent.

The term "germane data" as used herein shall be deemed to refer to data pertinent to the conversation including such data as (a) identifies entities, agents and targets or subjects about whom information is sought, (b) validates information supplied and/or (c) proves the presence of an entity.

For the avoidance of uncertainty it should be noted that although the entities using the communications network may be persons they may also be things either tangible (such as buildings, vehicles and items in transit) or intangible (such as businesses and organisations).

In the present invention the first agent acts as a gateway for accessing information held in a data repository such as a database and requiring the second agent to obtain access to it. Thus the first and second agents act on behalf of respective entities, one requiring information and the other able to release it, after a satisfactory negotiation.

In embodiments, one agent may act for multiple entities. The agent provides a service to entities for whom it acts. Advantageously, the agent may be always online, and able to respond to requests irrespective of whether its represented entity is available to be contacted. However, in some cases policies may dictate that agents seek confirmation I authorisation from their "client" entities in which case the conversation can be paused until the entity has provided authorisation.

The arrangement is straightforward to use in that users do not have to provide or remember or record any particular identifier (likely a complicated string, for security reasons) but only their agent's domain. The subject of a request for information emerges during the negotiation between the agents, and this means that the invention enables the subject of a request to be identified via natural language identifiers, e.g. name and address, email address, company registration number, identity papers and so forth.

The agents can work even when users are offline and can provide identity information, for instance, in circumstance such as during telephone calls or in response to in-person enquiries. This is possible because of two key characteristics of the agents: they can make decisions based on policy and they can wait for a response where the policy dictates that approval is required.

The agents each exist on an internet domain and they work together to exchange identity or other information, referring where necessary to third agents with additional information and the ability to provide accreditation, of both agents and entities. Thus agents are accredited to act as agents when they satisfy specified security requirements on hosting and integration. Accreditation of entities involves checking that the entity is secure and that their agent will represent them properly.

Third agents can be considered to be, or to represent, accreditation providers. Accreditation providers are trusted on the network to say whether or not a specified agent represents a specified entity. In many embodiments, there may be more than one accreditation provider and it is envisaged that agents on the network would respond to enquiries as to which accreditation provider(s) provide their accreditation. The agent of the appropriate accreditation provider can then be contacted to confirm that accreditation.

Once an agent is accredited to represent a particular entity, it can provide information within the scope of that entity, for instance the identity of a commercial company's employees, premises and products. Other agents may be accredited to represent an entity providing identity services to the general public, certifying the standard of the service provided. Still other agents can be accredited to provide secondary accreditation, such as certifying that an entity is a bona fide member of a particular trade body or that a person of interest holds a degree from a particular university.

The agents work to:

Individual policies, which specify conditions which must be met before a particular information item is released and which are central to the ability of the agents' ability to handle information as seamlessly as possible including when a user is offline, and A common protocol enabling two agents involved in a conversation to request whatever validation data is needed to fulfil their respective policies.

To initiate information exchange transactions, agents need to be integrated with a privileged system, which is to say a system such as an administration console with delegated authority to carry out security-related functions and which acts as controller of the agent, which may be for instance a website, a mobile app or an entry card reader in a building. In use, the privileged system instructs a first agent what information is required and the domain of the second agent holding it, and any supplementary information that may be needed to complete the transaction either up-front or during the conversation between the two agents. If and when the conversation is completed to the satisfaction of both agents, the required information is forwarded to the privileged system.

The second agent also has a privileged system that provides notification and approval where required by that agent's policy. For example, if a first agent has requested an individual name and photograph, the second agent's privileged system may demand that the individual entity being represented by the second agent be contacted (e.g. by way of an app) to get approval for their release. And to enable that individual to give informed consent, the second agent can pass on information received from the first agent such as the identity and location of the entity requesting the information and the reason for the request.

Agents work together through their common protocol, as mutual peers rather than in a client-server relationship in which the client has credential and an access level is defined. A negotiation for data between the agents is herein termed a conversation, and in the course of this either or each agent can demand validation of the other with a view to completing the conversation satisfactorily. One agent demanding validation of the other will typically include contacting a third agent for an accreditation provider, and querying the third agent as to whether the agent being validated is accredited to act for a specified entity. The accreditation provider will respond to this query, and on a positive response, the querying agent will know that the counterparty agent is indeed accredited to act for the specified entity.

In the present invention, conversations are symmetric. When a conversation is initiated by the first agent, the second agent opens up a connection back to the first agent to ask for whatever supporting information the second agent may need in order to respond positively, and this has two benefits as follows. First, the first agent must exist on the domain it claims and must have passed a security check—e.g., under Secure Sockets Layer (SSL) or Transport Layer Security (TLS)—and therefore cannot be an arbitrary and possibly hostile computer system. By closing the connection initiated by the first agent and then "calling back" the first agent, the second agent is using known techniques and common existing internet infrastructure (i.e. root certification authorities) to be sure as to the identity of the first agent. Hence, by using the mechanism of SSL connections and the infrastructure of certification authorities, the agents are sure of each other's identity as agents on the network. Then, to be sure of the other agent's authority to act for its "client" entity, each agent can contact a third agent for an accreditation provider. The third agent's identity as an agent can be confirmed in the same way—by making use of SSL and existing infrastructure. The third agent's authority as an agent of an accreditation provider is known to all agents on the network and can be propagated in a number of ways. The trustworthiness of the third agent as an agent of an accreditation provider can be considered similar to, and ensured in a similar way, to the trustworthiness of a root certification authority as an issuer of SSL certificates which verify the identity of servers. Secondly, it enables the two agents to build up confidence in one another to a point where the first agent is sure that the information on offer is valid and the second agent is sure that release of the information to the first agent is safe in accordance with the second agent's policy.

Conversations under the present invention provide for requests for proof as well as requests for information, a request for proof being a demand for evidence that a particular value is correct and being met by methods such as the exchange of a code derived from the data, for instance a hash. This is markedly different from and a step forward from known forms of decentralised identifiers such as W3C DID which is essentially limited to the exchange of proofs in a public system but where the World Wide Web Consortium W3C explicitly advises against the exchange of information.

Conversations may be resolved very quickly, and requested information supplied very soon. But the invention also, importantly, allows conversations to be paused or extended over a longer period of time, for example when a conversation calls for the disclosure of sensitive information requiring approval from an authorised entity. Thus the protocol allows such approval, or other procedures, to be placed on hold for a period before the request is fulfilled (or, if appropriate, denied).

A conversation is focused on the entity about which or whom information is requested, which entity may for convenience be deemed the "target", but it should be understood that many other entities may be referenced during the conversation, as the agents negotiate. Thus for example the first agent or the second agent may request data concerning the other or a related entity or a third party.

Those skilled in the art will now be able to see some notable differences between the present invention and the previously known systems mentioned above.

The Alcatel approach is essentially a derivative of a standard server/client application programming interface (API) in which a web browser acting as client submits a request and receives a response from an API at the server. In system terms, a client and a server are not mutual peers. In terms of protocol, rather than getting a direct response to a single question as in Alcatel, in the present invention the two agents query one another for identity data and negotiate release of the information sought. And whereas in Alcatel the initial message contains all information defining the request made, in the present invention it is not necessary for such information to be provided upfront, as it can be built up along with trust in the course of the conversation between the agents.

Mimos is concerned more with cryptography as a means of securing messages than with the content of messages, which is the focus of the present invention and for which secure channels are readily available e.g. as noted above through SSL or (preferably) TLS. There is also a notable difference in protocol between Mimos and the present invention. In Mimos responses to a challenge demand checks against a public key verified by a third party, in contrast to the (progressive) exchange of validation data in the present invention. Public key sharing is not necessary in the present invention.

CT Labs purports to calculate a measure of trust, whereas the present invention instead applies a policy comprising factors related to the communicating entities such as questions asked of the first agent, known relationships involving an entity, validation data from third party agents and, if and when required, approval by an entity holding requested information.

BRIEF DESCRIPTION OF THE DRAWINGS

Other features of the invention will be apparent from the following description, which is made by way of example only and with reference to the accompanying drawings which are purely schematic and in which.

DETAILED DESCRIPTION

Figure 1:
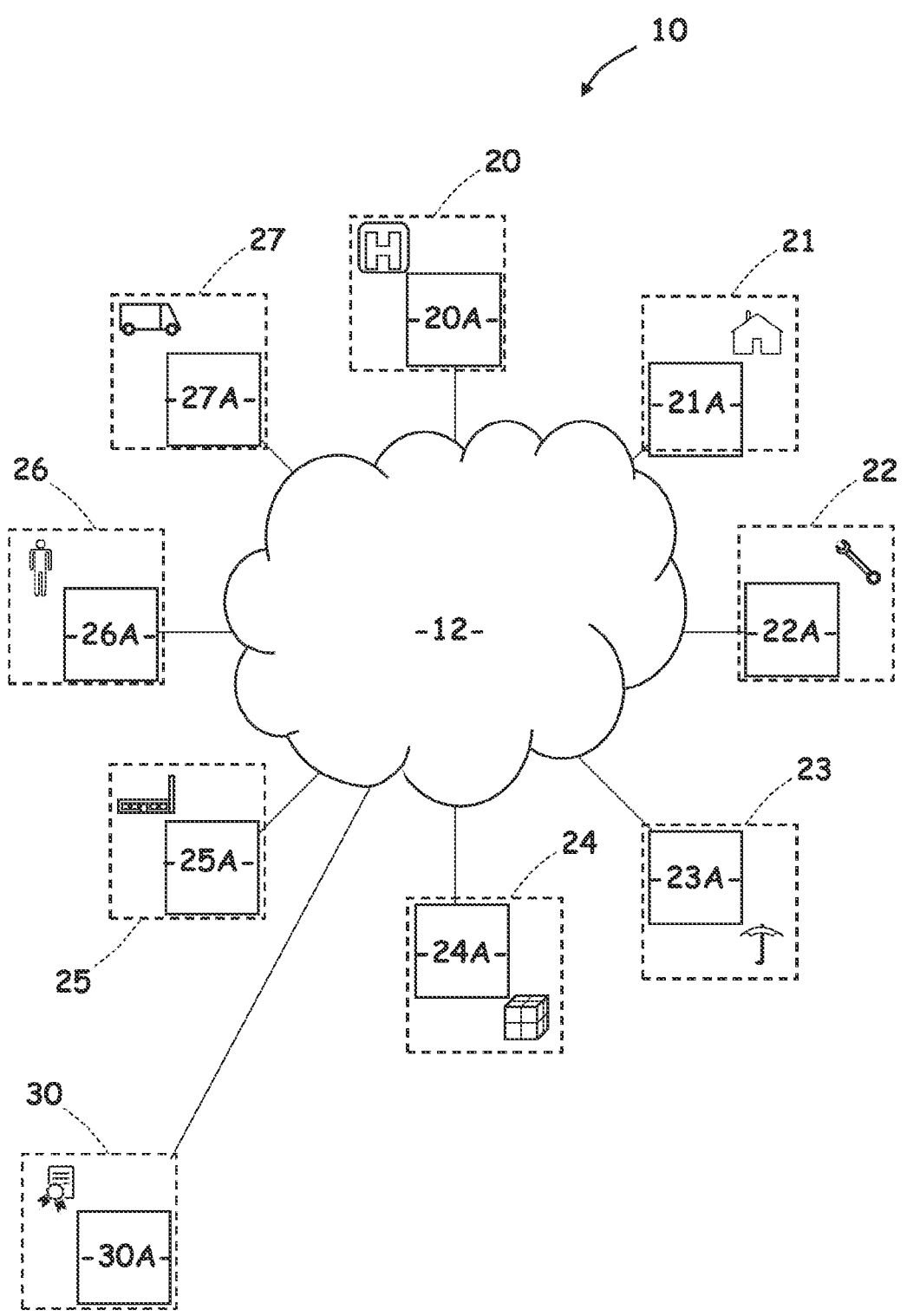
FIG. 1 illustrates a communications network embodying the invention.

Referring now to FIG. 1, the communications network 10 shown schematically therein enables a plurality of entities to obtain digital information from one another. The communicating entities may be persons, but they may also they may also be things such as buildings, vehicles and items in transit or intangible entities such as businesses and organisations. The number and variety of entities using the network is not limited, but by way of example FIG. 1 shows (with appropriate icons for case of understanding): a hospital 20, a house 21, a facilities management (FM) company 22, an insurance company 23, a package 24, a factory 25, a person 26, a delivery van 27 and also a professional register 30.

Each of the entities 20-27 and 30 has a computer system connected to the Internet 12 and acting as its entity's agent for communications. Thus the hospital 20 has an agent 20A, the house 21 has an agent 21A and so forth. The agents 20-27 and 30 are all mutual peers on the network 10. Note that in embodiments, one agent can act for multiple entities. The agent is not necessarily controlled or owned by the client entity but is trusted by the client entity to represent the entity in transactions for the exchange of data according to an agreed policy.

The network 10 is designed particularly to enable entities to exchange information securely by way of their agents, an example of which will now be described. Suppose the insurance company 23 requires, in connection with a claim, to obtain a digital copy of an X-ray of the claimant taken at the hospital 20. It submits its requirement through its agent 23A, which transmits it over the Internet 12 to the agent 20A for the hospital 20 and so initiates a conversation between the first agent 23A and the second agent 20A. The first agent

23A and the second agent 20A have individual policies defining standards for their management of digital information such as the X-ray and a common operating protocol whereby:

when the conversation has been initiated, the first agent 23A and the second agent 20A request and exchange germane data; and when the second agent 20A has sufficient validation data about the first agent 23A to meet its policy standards for releasing a copy of the X-ray to the first agent 23A and the first agent 23A has sufficient validation data from the second agent 20A to meet its policy standards for certification of the X-ray, then the second agent 20A releases the digital copy of the X-ray required to the first agent 23A.

For the insurance company 23 to be sure of the provenance of the X-ray, there is an addition to the above process under which the insurance company checks the qualifications of the radiographer responsible, as will now be described. Radiographers are required by law to be properly qualified and registered with a regulatory body, which in the United Kingdom is the Health and Care Professions Council (HCPC). Therefore, having obtained the identity of the radiographer concerned from the second agent 20A, the first agent 23A also checks the register 30 through a third agent 30A thereat.

It will be understood that the process can be used mutatis mutandis by any first agent wanting to obtain an item of information from any second agent and have it substantiated by a third agent. Thus for example an individual 26 may determine the estimated time of arrival of a package 24 he or she has ordered and check the location of the van 27 delivering it. And the van 27 can ascertain the shortest route to a house 21 for the delivery and also check that the individual 26 will be at home.

The common operating protocol preferably includes means— whereby either the first agent or the second agent may terminate the conversation if the other fails to provide validation data which it considers satisfactory under its policy and/or the information item required; and/or whereby either the first agent or the second agent may pause the conversation, for instance to make enquiries elsewhere; and/or whereby either the first agent or the second agent may connect to a third agent during the course of a said conversation, for instance for independent validation; and/or enabling a said third agent to provide accreditation of agents and entities; and/or prescribing security clearance for each said agent; and/or whereby any said agent may request proof of validation data, that is, evidence that a particular value is correct, which may be provided by exchanging a code derived from the data.

In particular third agents may act as agents for, or in some embodiments may be considered to be, accreditation providers. The role of an accreditation provider is to provide a trusted source of agent-entity relationships, i.e. to confirm whether a specified agent is accredited to represent a specified entity. Note that, in embodiments, an agent may (indeed, may usually) represent multiple entities, in exactly the same way that a lawyer may act as a representative for multiple clients. Similarly, in some cases a particular entity may have more than one agent authorised to act for it. This may be done where agents are required to fulfil different purposes, or simply for redundancy to ensure that a working agent to represent the entity is always available.

Whilst the invention may be of use in an intranet or other private network, it is perceived as being of greatest benefit if the agents are connected to and conduct their conversations by way of the Internet. To this end it is preferred that each agent exist in a domain of the Internet attributed to that agent.

It is also preferred that said agent be integrated with a privileged system having delegated authority to carry out security-related functions which acts as controller of the agent. For the first agent, the privileged system instructs what information is required and the domain of the second agent holding it, plus any supplementary information that may be needed to complete the transaction. For the second agent, the privileged system provides notification and approval where required by that agent's policy.

Set out below by way of example is the text of an imaginary but representative conversation between a first agent and a second agent during which reference is made to a third agent:

| Stage | First Agent | Second Agent | Third Agent |
|---|---|---|---|
| 1 | I want to know an email address of someone | | |
| 2 | | 'First Agent', tell me your agent accreditation | |
| 3 | I'm accredited by 'Third Agent' | | |
| 4 | | 'First Agent', tell me what what organisation is asking | |
| 5 | The organisation is Acme Corp | | |
| 6 | | 'Third Agent', is 'First Agent' accredited to represent Acme Corp? | |
| 7 | | | Yes |
| 8 | | 'First Agent', what is the name of the person who is asking? | |
| 9 | 'Second Agent', tell me your agent accreditation | | |
| 10 | | I'm accredited by 'Third Agent' | |
| 11 | 'Third Agent', can you vouch for 'Second Agent'? | | |
| 12 | | | Yes |
| 13 | The person who is asking is Bob Smith | | |
| 14 | | 'First Agent', what is the name of the person for whom you want to know the email address? | |
| 15 | The person for whom I want the email address is Alice Jones | | |
| 16 | | I can now tell you that for Alice Jones, email = ajones@example.com | |

Notice that the information requested is not released until the end of the conversation. after the first and second agents have built up trust in one another by supplying validation data.

Figure 2:
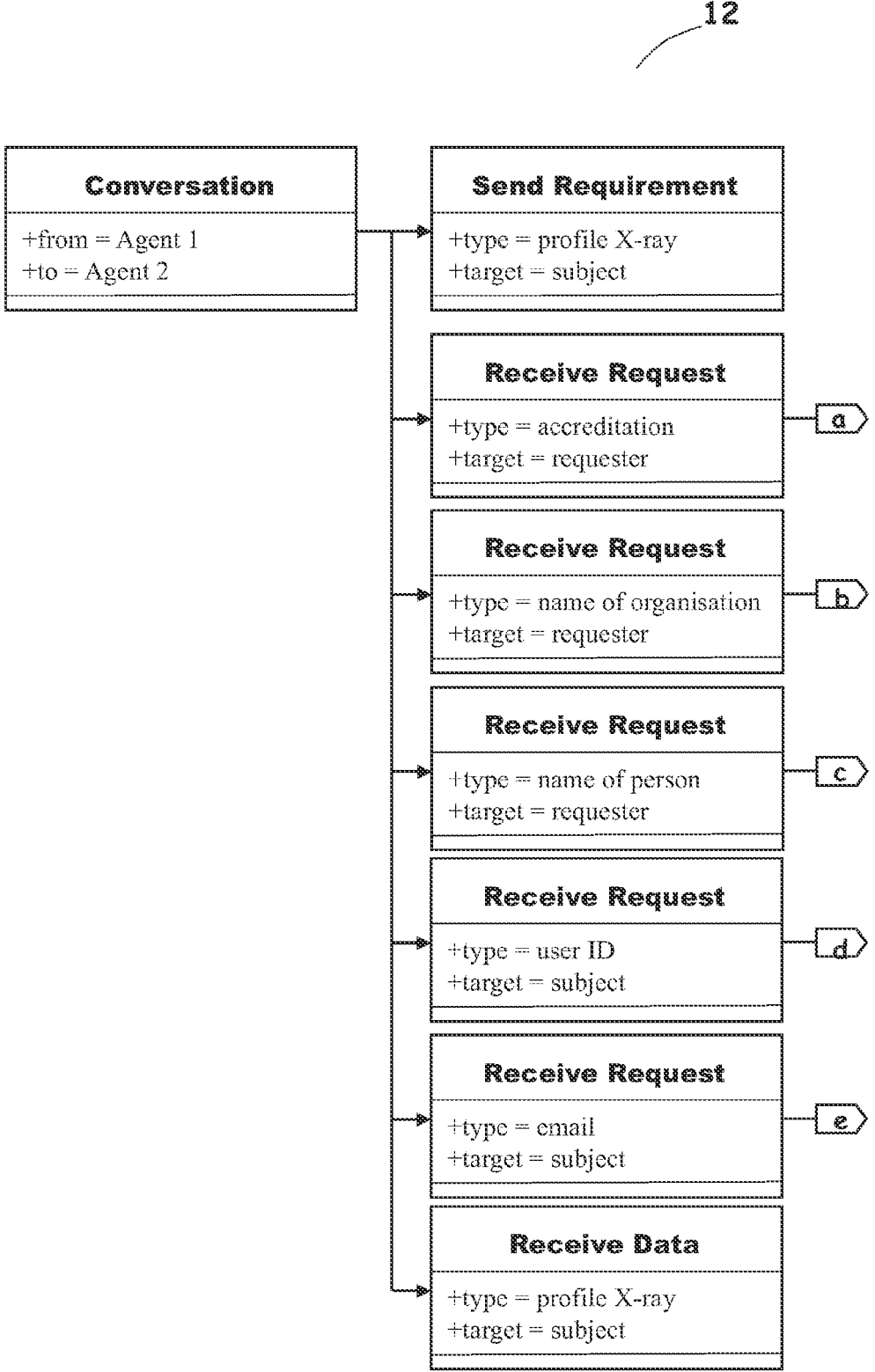
FIGS. 2 to 4 combine to form a block diagram illustrating a conversation between a first agent and a second agent of a communications network embodying the invention.
Figure 3:
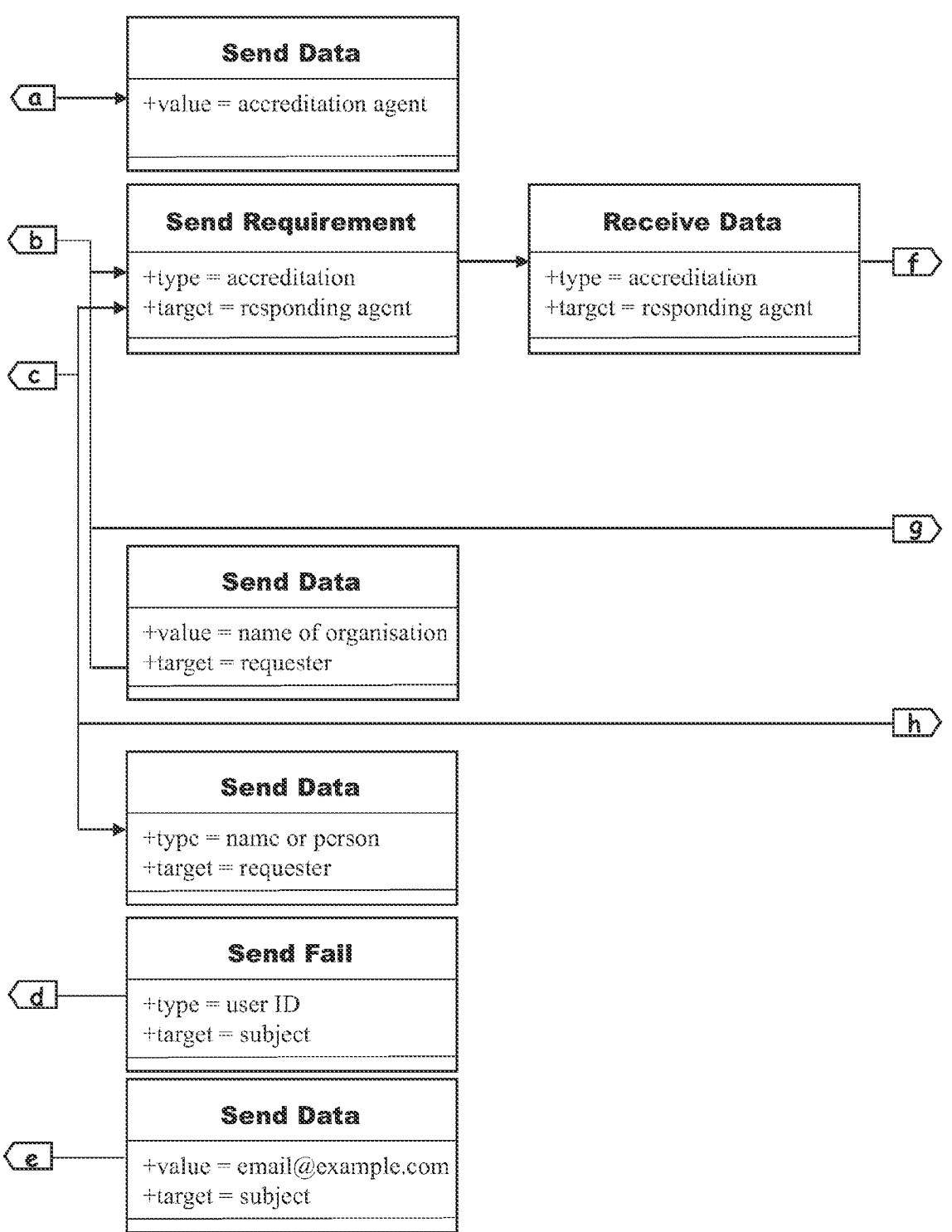
Figure 4:
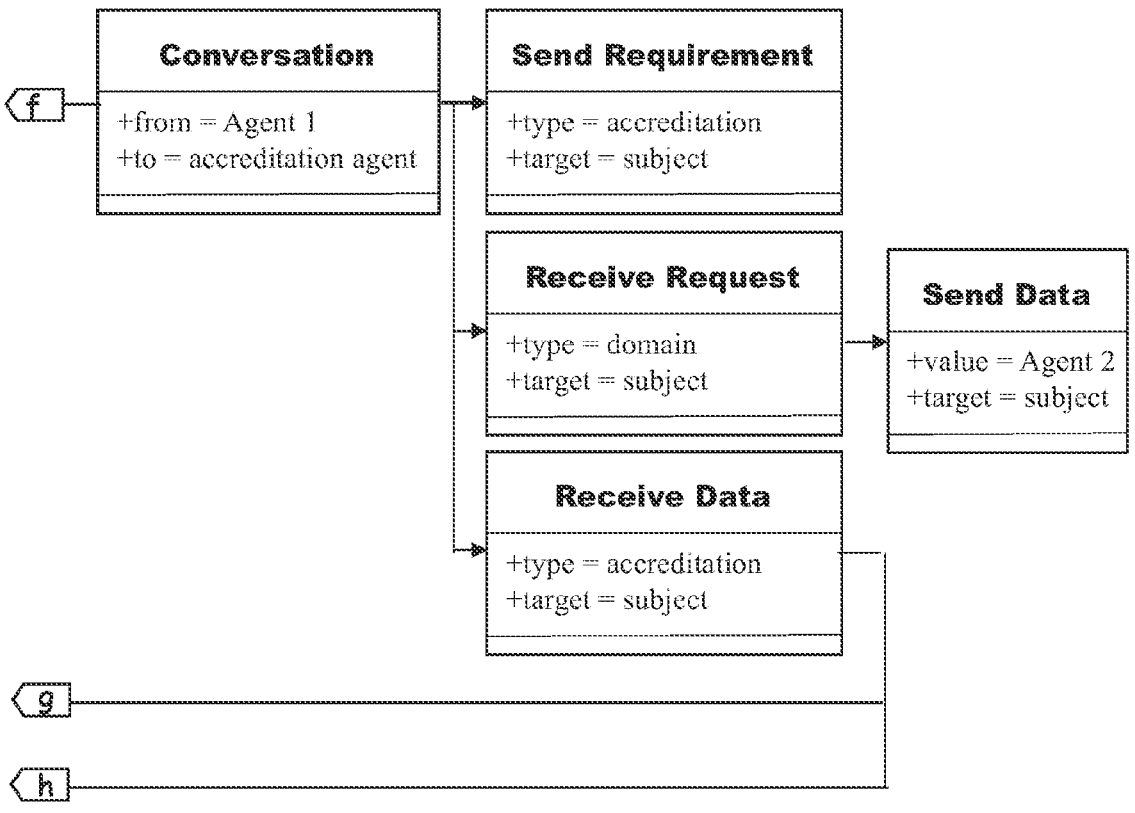

FIGS. 2 to 4, taken together by way of the off-page connectors a-h, provide an alternative illustration of a conversation between a first agent (identified as Agent 1 in FIGS. 2 to 4, for compactness) and a second agent (aka Agent 2). The representation of the conversation in FIGS. 2 to 4 is as from the perspective of Agent 1. And in FIGS. 2 to 4, "Requirements" are identity queries sent by Agent 1 whilst "Requests" are sent by Agent 2.

Agent 1, acting for the insurance company 23 of FIG. 1, is trying to obtain a copy of an X-ray image from Agent 2, acting for the hospital 20 of FIG. 1. To accomplish this, Agent 1 initiates a conversation by sending a message to Agent 2. It should be noted that although the conversation begins by stating a requirement for an X-ray image of a "subject", at this point the subject is not identified.

The initial statement of the X-ray requirement by Agent 1 prompts Agent 2 to request information regarding the accreditation of Agent 1, and then the organisation and the person (i.e., the "requester") from which the request originates. This is to comply with Agent 2's policy.

In turn, and to be able under its own policy to divulge the requested information, Agent 1 asks for accreditation data from Agent 2. Agent 1 checks this with another agent in a secondary conversation—a conversation with a third agent which is an agent for an accreditation provider. Agent 1 knows that Agent 3 is a trusted accreditation provider agent because Agent 3 is on a list of trusted agents. Agent 1 knows that Agent 3 is the accreditation provider for Agent 2 because Agent 1 has asked Agent 2 who is the appropriate accreditation provider, and Agent 2 has said that it is Agent 3. When satisfied, Agent 1 reveals to Agent 2 the organisation and person wanting the information required.

Once Agent 2 has the organisation and user data it requested, it has met the terms of its own policy and now asks for the identity of the subject of the conversation, i.e., the person whose X-ray image is needed by Agent 1. It will be seen that at first Agent 2 asks for ID regarding the subject, but this is not known. Therefore Agent 2 then asks for an email address, which is known to Agent 1 and, when this is revealed by Agent 1, Agent 2 releases the X-ray image and the conversation ends.

Basic policies for three agents involved in a conversation as above may be summarised as follows.

For the First Agent
On Accreditation Request:
    release
On Organisation Request:
    release
On Requester_Name Request:
    check conversation started locally
    require accreditation from the second agent
    check accreditation provider is known
    require accreditation validation from provider
    release
For the Second Agent
On Accreditation Request:
    release
On Email Request:
    require accreditation from the first agent
    check accreditation provider is known
    require accreditation validation from provider
    require name of subject OR require user number of subject
    release
For the Third Agent
On Accreditation Validation Request:
    release Finally, an example of the invention's being used to prove the presence of some person or thing will be described. Here the system proves the physical presence of a person at a particular site, but the invention could also be used in a similar way to prove the identity of a person during a telephone call or to establish the location of some item.

In this example, referring back to FIG. 1, the FM company 22 has a contract with the hospital 20 to maintain the latter's premises and plant, including its hot water system. The FM company 22 determines that the hot water system needs servicing, and on an agreed date sends one of its engineers to the hospital 20 to carry out the work. As will be understood from the foregoing description with reference to FIG. 1, the FM company 22 has an agent 22A and the hospital 20 has an agent 20A, both connected to the Internet 12. The agent 22A represents and can identify the organisation and personnel of the FM company 22 and the agent 20 can represent and identify the organisation and estate of the hospital 20. And hereinafter the agents 22A and 20A will be referred to as the first agent and the second agent respectively.

At the hospital 20 the hot water plant is locked up in a boiler room having a security door with an electronic keypad entry system. The engineer carries a smartphone loaded with an application (app) by means of which he can request access to the boiler room. This app (not detailed in FIG. 1) is part of the privileged system of the first agent 22A and has secure means to initiate a user session with the engineer. The door entry system with the keypad (also not detailed in FIG. 1) is part of the privileged system of the second agent 20A The engineer signals his need for access using the smart phone app and the first agent 22A asks where access is wanted. The app passes this request on to the engineer, who responds in an appropriate way, for instance by selecting the hospital 20 from a list of FM clients or by scanning a QR code on the security door. The first agent 22A then initiates a conversation with the second agent 20A with a door access request.

During the identity conversation the second agent 20A requests and receives information regarding the first agent 22A, the FM company 22, the engineer's qualifications and the reason for the engineer's requesting access.

Using this verified information and because of the contractual relationship between the hospital 20 and the FM company 22, the policy of the second agent 20A is to allow the engineer access to the boiler room if he is present at the security door. Therefore, to ascertain the engineer's presence, the second agent 20A requests proof-of-presence from the first agent 22A and provides the first agent 22A with a single-use numerical code.

The first agent 22A now passes the numerical code to the engineer via the app, and the engineer types the code into the keypad on the door entry system. Because the door entry system is part of the privileged system of the second agent 20A, the second agent 20A can then then verify the value of the single-use numerical code returned by the engineer and grant access to the boiler room by unlocking the security door. Thus the engineer can now carry out the maintenance work.

The key to the proof-of presence process is that the second agent 20A (of the hospital 20) provides a single-use code to the first agent 22A which must then be returned by the engineer (the target) to the requester to prove his or her presence.

If required, the process may be extended by the second agent 20A asking which door the engineer wants to enter, which could be identified by a code on the door or through a QR code scanned by the engineer. Alternatively, the second agent 20A may wait to see into which keypad the code is keyed and thereby deduce which door it is.

It will be understood that, because the conversation between the first and second agents is automated, the whole transaction can be completed in less time than is needed to describe it, even in extended form. It will also be understood that means other than those outlined above may be used to interchange a single-use code, e.g., over a phone call with an operator, through near-field communication (NFC) with the engineer's device, or via a camera on the door scanning a QR code on the screen of the engineer's smartphone.

The invention claimed is:

1. A communications network enabling a plurality of entities to obtain digital information from one another, which communications network comprises a plurality of systems which are mutual peers on the network configured and arranged to operate as agents for respective entities, wherein the plurality of such agents comprises a first agent for a first said entity requiring an item of digital information and a second agent for accessing the said item of digital information, and wherein said first and second agents have individual policies defining standards for the management by the respective first and second agents of said digital information and a common operating protocol, the common operating protocol allowing an agent to request data, and wherein the plurality of agents further comprises a third agent for an accreditation provider, wherein the third agent is configured to respond to queries from other agents as to whether a specified agent is accredited to represent a specified entity, whereby:

said first entity initiates an information exchange process by entering a request for the required information item on the first agent, the first agent connects to the second agent and the first and second agents then engage in a conversation in which the first and second agents request and exchange germane data, the conversation including the first agent making a request for the item of digital information from the second agent, and the second agent making a request for at least one item of data from the first agent, and the first agent responding to the second agent; and when the second agent has sufficient data to meet the second agent's policy standards for releasing said information item to the first agent then the second agent releases the information item to the first agent; and during the course of the information exchange process, either:

the second agent connects to the third agent to ascertain whether the first agent is accredited to represent the first entity, and the third agent replies to the second agent to determine whether the first agent is accredited to represent the first entity, or the first agent connects to the third agent to ascertain whether the second agent is accredited to represent the second entity, and the third agent replies to the first agent to determine whether the second agent is accredited to represent the second entity.

2. The communications network as claimed in claim 1 wherein the common operating protocol includes means whereby the first agent continues the conversation after the information item has been released by the second agent if the first agent requires additional verification thereof.

3. The communications network as claimed in claim 1, wherein the common operating protocol includes means whereby the first agent terminates the conversation if the second agent fails to provide data which the first agent considers satisfactory under the first agent's policy and/or the information item required.

4. The communications network as claimed in claim 1, wherein the common operating protocol includes whereby the second agent terminates the conversation if the first agent fails to provide data which the second agent considers satisfactory under the second agent's policy.

5. The communications network as claimed in claim 1, wherein the common operating protocol includes means whereby either the first agent or the second agent pause the conversation.

6. The communications network as claimed in claim 1, wherein said agents are connected to conduct said conversations by way of the Internet.

7. The communications network as claimed in claim 6 wherein each said agent exists in a domain of the Internet attributed to that agent.

8. The communications network as claimed in claim 7 wherein the common operating protocol includes means prescribing security clearance for each said agent.

9. The communications network as claimed in claim 1, wherein the common operating protocol includes means whereby any said agent requests proof of germane data.

10. The communications network as claimed in claim 1, wherein each said agent is integrated with a privileged system.

11. The communications network as claimed in claim 10 wherein the common operating protocol includes proving means operative to prove the presence of a said entity.

12. The communications network as claimed in claim 11 wherein the privileged system includes a smartphone app.

13. The communications network as claimed in claim 10, wherein the proving means includes a single-use code passed by said second agent to said first agent and then returned to the second agent by way of the second agent's privileged system the first agent as proof of presence.

14. The communications network as claimed in claim 1, in which, during the course of the conversation, the second agent opens a new connection back to the first agent.

15. The communications network as claimed in claim 14, in which, during the course of the conversation, the second agent closes a connection initiated by the first agent.

16. The communications network as claimed in claim 1, in which the second agent making a request for at least one item of data from the first agent includes the second agent making a request for at least one item of validation data from the first agent.

* * * * *